March 19, 1946.  W. M. PHILLIPS, JR  2,396,968
TORCH FOR WELDING THERMOPLASTIC MATERIAL
Filed April 16, 1943  2 Sheets-Sheet 1
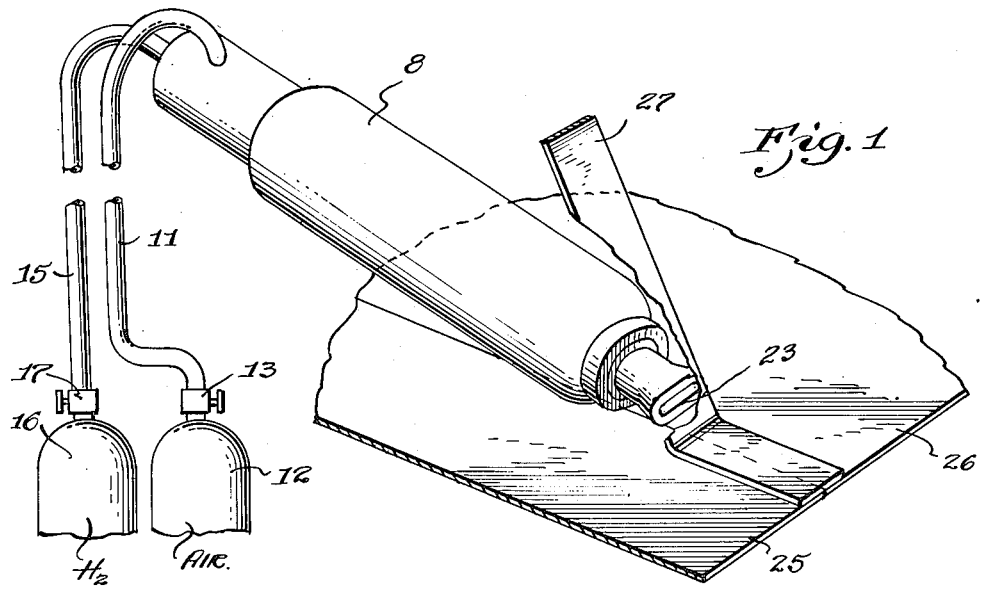
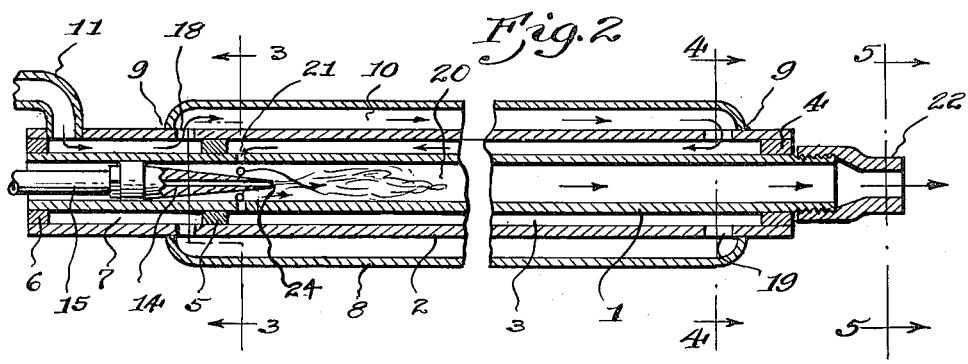
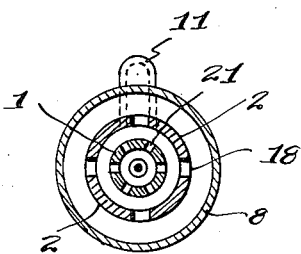
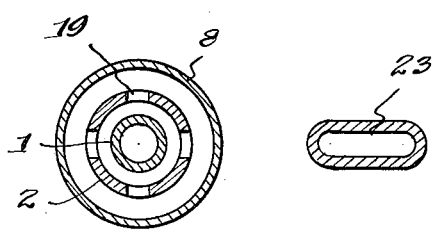
INVENTOR.
William M. Phillips, Jr.
BY Barnes, Kisselle, Laughlin & Raisch
Attorneys.

March 19, 1946. W. M. PHILLIPS, JR 2,396,968
TORCH FOR WELDING THERMOPLASTIC MATERIAL
Filed April 16, 1943 2 Sheets-Sheet 2
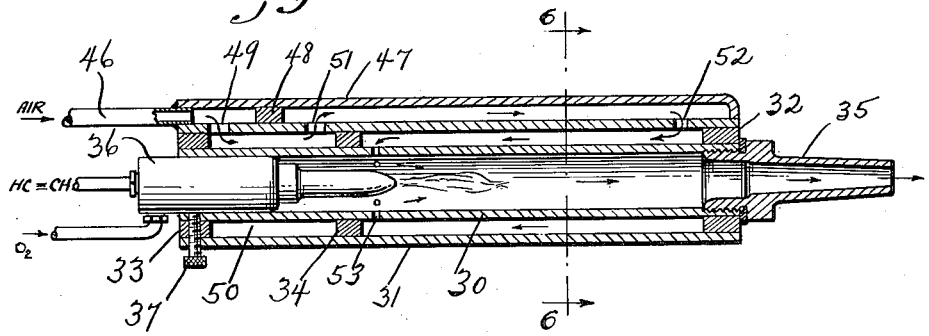
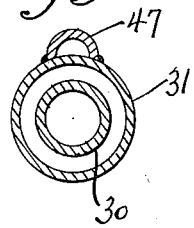
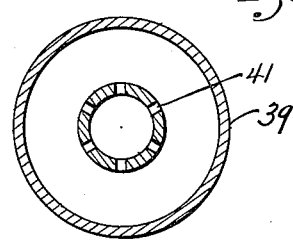
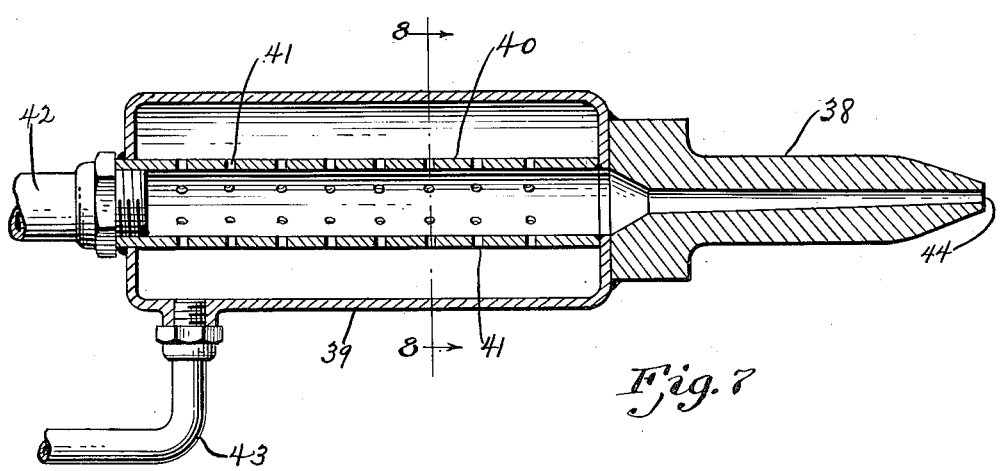
INVENTOR.
William M. Phillips, Jr.
BY Barnes, Kisselle, Laughlin & Raisch
Attorneys.

Patented Mar. 19, 1946

2,396,968

UNITED STATES PATENT OFFICE 2,396,968

TORCH FOR WELDING THERMOPLASTIC MATERIAL

William M. Phillips, Jr., Detroit, Mich., assignor to The Udylite Corporation, Detroit, Mich., a corporation of Delaware Application April 16, 1943, Serial No. 483,364

2 Claims. (Cl. 263—19)

This invention relates to a torch and more particularly to a torch which is useful in the welding of thermoplastic materials. In the copending application of Gunnar Lindh and William M. Phillips, Jr., Serial No. 476,228, filed February 17, 1943, there is described a method for welding thermoplastic materials which uses a jet or blast of gas at a temperature sufficient to bring the thermoplastic substances being welded to their welding temperature.

This invention contemplates a torch which produces a hot gaseous blast or jet which is efficient in operation, easily manipulated in the welding of thermoplastic sheets or articles, and which is simple in structure.

In welding thermoplastic materials it is essential that the materials should not be brought to their charring temperature. It is the object of this invention to produce a torch for welding of thermoplastic materials in which the temperature of the hot gaseous blast can be easily controlled to avoid charring of the thermoplastic material being welded.

This invention also contemplates a light tool which gives an adequate supply of hot air or gas at high velocity. It is an object of this invention to produce a small, light weight, portable tool which can be easily manipulated either by hand or by a mechanical traversing mechanism.

Fig. 1 is a perspective showing the torch in welding position relative to the thermoplastic material being welded.

Fig. 2 is a longitudinal section through the torch.

Figs. 3, 4 and 5 are sections along the lines 3—3, 4—4 and 5—5, respectively, of Fig. 2.

Fig. 5a shows a longitudinal section through a modified form of torch.

Fig. 6 is a section along the line 6—6 of Fig. 5a.

Fig. 7 is a longitudinal section through the nozzle member of the torch shown in Fig. 5a.

Fig. 8 is a section along the line 8—8 of Fig. 7.

Referring more particularly to the drawings it will be seen that the torch comprises a combustion tube 1 of any suitable material such as copper. Tube 1 is mounted within tube 2 and in spaced relation therewith to provide a passageway 3 for counter-current flow of one of the gases as explained below. Tube 2 likewise can be fabricated from any suitable material such as copper or steel.

Tube 1 is fixedly supported within tube 2 by means of spacing rings 4, 5 and 6 which preferably have a gas-tight seal along their inside circumference with tube 1 and along their outside circumference with the inside of tube 2. Thus, rings 4 and 5 cooperate with tubes 1 and 2 to form the passageway 3 and rings 5 and 6 cooperate with tubes 1 and 2 to form the passageway 7.

A tubular casing 8 of steel or any other suitable material is positioned over the tube 2 and is welded or otherwise secured thereto as at 9 to form a gas-tight joint. Casing 8 being spaced from tube 2 provides a passageway 10 surrounding tube 2 through which a gas flows in counter-current direction to the gas in passageway 3. Tube 2 is connected at one end by means of pipe line 11 with a source of gas 12 preferably under pressure. The flow of gas from source 12 into line 11 is controlled by a valve 13. A nozzle 14 is fixed within tube 1 and connected by means of pipe line 15 with another source of gas 16 under pressure. The flow of gas from source 16 into line 15 is controlled by valve 17.

Passageway 7 communicates with passageway 10 by means of a plurality of orifices 18. Passageway 10 communicates with passageway 3 by means of a plurality of orifices 19, and passageway 3 communicates with the combustion chamber 20, that is, the interior of tube 1, by means of a plurality of orifices 21. The orifices or jets 21 should be circumferentially spaced about the nozzle 14 and positioned upstream, that is, to the left of the nozzle outlet orifice 24, otherwise no flame will be produced in the combustion chamber. Tube 1 is provided with an outlet nozzle 22. The nozzle 22 preferably is provided with a flattened or elongated outlet 23 which spreads the hot gaseous blast flowing from the torch.

Various combustible gases can be burned in the torch to produce the gaseous blast of the temperature desired, such, for example, as hydrogen, acetylene, methane, ethylene, propane, and other hydrocarbon combustible gases, gasoline or oil. For supporting combustion the preferred gas is oxygen or air. The gas flowing from outlet 23, however, should be inert with respect to the thermoplastic material being welded. The preferred combustible mixture consists of a mixture of hydrogen and air.

The hydrogen is stored under high pressure in cylinder 16 and fed through line 15 to nozzle 14. The air under high pressure is stored in cylinder 12 and fed through line 11 to passageway 7. The path traversed by the air is indicated by the arrows; namely, the air flows from passageway 7, through ports 18 into and through passageway 10 and then through ports 19 into passageway 3 wherein the air reverses its direction of flow as it passes through passageway 3. The air then flows through orifices 21 into the combustion chamber 20 wherein it mixes and burns with the hydrogen flowing from the nozzle 14. The gaseous combustion products of the hydrogen and air, as well as some of the air which has not burned or chemically combined with the hydrogen, flows in counter-current direction to the air in chamber 3, as indicated by the arrows, and then out of the nozzle 22. Preferably more air passes into the combustion chamber than can chemically combine with the hydrogen. Thus issuing from nozzle 22 we have a hot gaseous blast comprising steam (the combustion product of hydrogen and oxygen) and hot air. The temperature of the gas blast issuing from outlet 22 will be controlled as described in the above-mentioned copending application, but in any event will be sufficiently high to melt or bring the thermoplastic materials to their welding temperature. The temperature of the blast flowing from nozzle 22 can be nicely controlled by means of valves 13 and 17. If the temperature of the gas flowing from the combustion chamber is too high, then valve 13 can be opened wider to admit more air into the combustion chamber and thus bring the temperature of the gases in the combustion chamber down, or valve 17 can be turned to throttle down the amount of hydrogen flowing into the combustion chamber. In other words, by varying the relative amounts of hydrogen and air flowing into the combustion chamber 20 the temperature of the gas blast from outlet 22 can be raised or lowered and controlled as desired. The outlet orifice 22 for nozzle 14 is preferably positioned ahead or downstream from orifices 21 through which the air flows into the combustion chamber.

In a production torch of the type above shown and described, a number 2 jet was used for the hydrogen outlet 24 and this outlet was positioned 1/16 of an inch ahead or downstream of six air inlet orifices 21 each 1/16 of an inch in diameter. The inside diameter of the brass combustion tube was 3/8 of an inch and the length of the tube 6 inches. The wall thickness of the brass tube 1 was 1/16 of an inch and the space between tubes 1 and 2 was 1/16 of an inch.

The counter-current flow of air through passageways 10 and 3 keeps the outside of the tool cool so that it can be handled by the operator without burning his hands and also increases the efficiency of the tool because no heat generated therein is wasted. In Fig. 1 the tool is shown being used in welding together sheets 25 and 26 of a thermoplastic material. The weld strip or rod is designated 27. The hot blast of gas flowing from outlet 23 melts the upper surfaces of sheets 25 and 26 adjacent their joint and the under surface of weld strip 27 so that they weld together in the manner taught in the above-mentioned copending application.

This tool or torch is useful for welding thermoplastic materials, and in particular for welding of the vinyl resins or thermoplastic polymerized vinyl compounds, such as "Saran B–115," a trade name for a copolymer of vinylidene chloride and vinyl chloride, "Koroseal," a trade name for polymerized vinyl chloride plasticized with any of numerous well known organic plasticizers such as tricresyl phosphate or dioctyl phthalate, "Saran F–125," a trade name for a copolymer of vinylidene chloride and vinyl cyanide, "Vinylite," a trade name for a copolymer of vinyl chloride and vinyl acetate, polystyrene (polymerized styrene), polymers of vinyl benzene, polymers of vinyl chloride, polymers of vinyl acetate.

This tool is also useful in the retreading of synthetic rubber tires. The new tread can be applied to the tire by directing the hot gaseous blast against the surfaces to be welded to bring them to their welding or joining temperature, thereby bonding the tread material to the tire.

To provide the hot gaseous blast, this torch requires that a combustible gas or a mixture of a combustible gas and a gas which supports combustion should be supplied through nozzle 14 to the combustion chamber 20. If only a combustible gas flows through nozzle 14, then sufficient gas which supports combustion must be supplied around the stream of combustible gas through orifices 21. If a mixture of a combustible gas and a gas which supports combustion containing less than the required amount of said latter gas flows through nozzle 14, then sufficient gas to support combustion must be supplied through orifices 21 around this stream of gaseous mixture flowing from nozzle 14. The flame resulting from combustion in the combustion chamber 20 preferably should not strike the thermoplastic material because it will cause charring. Therefore, the burning gases are diluted in the combustion chamber either by an inert gas such as carbon dioxide, helium, or nitrogen, or by an excess of gas which supports combustion. By thus diluting the hot products of combustion down to the temperature desired, one also obtains sufficient and the desired velocity of the heated gas or gaseous mixture flowing from the nozzle 22. The velocity of the hot gas blast from nozzle 22 should not be sufficient to blow away the melted thermoplastic material from the area being welded which obviously would render the weld ineffective. Whether the blast has sufficient velocity or force to blow away the melted thermoplastic material can be readily ascertained by test and thus forms a very practical criterion for determining the proper velocity of the hot gas blast. If the velocity of the blast is such that it blows away the melted thermoplastic material, then the velocity of the blast should be slowed down below the velocity at which it blows away the melted thermoplastic. In regulating the heat output of the torch and arriving at a suitable gas blast for welding thermoplastic material, several variables must be taken into consideration and all coordinated one with the other. These variables are: (1) melting point of the thermoplastic material being welded, (2) heat absorption coefficient of said thermoplastic material, (3) heat conductivity of said thermoplastic material, (4) temperature of the gas blast, (5) velocity of the gas blast.

The flow of air or gas about the outside of tube 1 preparatory to entering the combustion chamber serves a two-fold purpose; namely, this flow of air or gas cools down the outer casing 8 so that it can be readily handled by the operator without burning his hands and also pre-heats the gas or air entering the combustion chamber which obviously makes the torch more efficient. Since the combustion chamber is insulated by the gas or airflow in tube 2, the combustion chamber can be located within the handle portion 8 of the torch. This materially cuts down the size of the torch and makes it more easily manipulated.

The modified form of the torch shown in Figs. 5a to 7 comprises a tubular combustion chamber 30 which is surrounded by a tubular casing 31. The combustion tube 30 is made from any suitable metal or refractory material. Spacing rings 32, 33 and 34 support tube 30 within tube 31 and have gas tight joints with tubes 30 and 31. A nozzle 35 is threaded into the end of the combustion chamber. In this form of the torch a removable nozzle assembly 36 is provided which can be slid into the end of tube 30 and removably retained therein by a set screw 37. Assembly 36 has a gas tight fit with the tube 30. This nozzle assembly 36 is designed to inject a combustible mixture into the combustion chamber and to this end comprises a nozzle 38, an outer shell 39 and a mixing chamber 40. The mixing chamber 40 comprises a tubular member mounted within and in spaced relation with, shell 39 and provided with a plurality of orifices 41. The end of tube 40 remote from nozzle 38 is connected by means of a tube or conduit 42 with a source of acetylene or other combustible gas under pressure. The shell 39 is connected by means of tube or conduit 43 with a source of gas under pressure which supports combustion, such, for example, as oxygen. The oxygen under pressure in shell 39 passes through orifices 41 into the mixing chamber where it intermixes with the acetylene to form a combustible mixture which flows in a stream or jet from the outlet orifice 44 of nozzle 38 into the combustion chamber 30 where it burns.

As a diluent for controlling the temperature and the velocity of the gas blast from nozzle 38, air under pressure is supplied to the combustion chamber. To this end a source of air under pressure is connected by means of a tube or conduit 46 with one end of conduit 47. Conduit 47 is divided into two parts by means of a partition 48. Air flows from line 46 through opening 49 into chamber 50 between rings 33 and 34 and thus circulates about tube 30 to cool the end of this tube about the nozzle assembly 36. The air then flows through opening 51 in casing 31 back into conduit 47 in the direction indicated by the arrows and then passes through opening 52 into casing 31 where it flows in a counter-current direction with the hot gases in combustion chamber 30. The air as thus pre-heated then passes through orifices 53 into the combustion chamber where it mixes with the hot gases of combustion preparatory to flowing from nozzle 35. Here again the flow of air on the outside of the combustion chamber preparatory to entering the same cools the outer casing 30 of the tool down so that it can be handled without burning the hands of the operator. This flow of air is also pre-heated before entering the combustion chamber and thereby increases the efficiency of the tool. This flow of air about the combustion chamber before entering the same also facilitates and makes possible the design of this tool so that it is relatively small in view of the high heat output of the same.

I claim:

1. A torch for producing a hot gaseous blast comprising an elongated combustion chamber having an inlet and an outlet at the other end, an elongated casing surrounding said combustion chamber and spaced therefrom to form a passageway about said combustion chamber said casing serving as a hand-grip, an inlet in said casing remote from the inlet in said combustion chamber, means for introducing a combustible gas into said combustion chamber, and means for introducing a gas under pressure which supports combustion through said inlet in the casing whereby said gas flows through said casing without the combustion chamber in counter-current and heat interchange relation with the gases in the combustion chamber preparatory to passing through the inlet into said combustion chamber whereby said gases intermix and the combustible gas burns, the said products of combustion being cooled by said heat interchange below their combustion temperature preparatory to flowing through the outlet of the combustion chamber in the form of a hot blast, the gas in said casing cooling the same to a sufficiently low temperature for manually handling.

2. A torch for producing a hot gaseous blast comprising an elongated combustion chamber having a plurality of circumferentially spaced inlets at one end and an outlet at the other end, an elongated casing surrounding said combustion chamber and spaced therefrom to form a passageway about said combustion chamber, an inlet in said casing remote from the inlet in said combustion chamber, a second casing surrounding said first mentioned casing and serving as a hand grip, said second casing having an inlet remote from the inlet in the first casing, means for introducing a combustible gas into said combustion chamber, and means for introducing a gas under pressure which supports combustion through said inlet in the second casing whereby said gas flows through said second casing outside of said first casing and then through said inlet into the first casing without the combustion chamber in counter-current and heat interchange relation with the gases in the combustion chamber preparatory to passing through the inlet into said combustion chamber whereby said gases intermix and the combustible gas burns, the said products of combustion being cooled by said heat interchange preparatory to flowing through the outlet of the combustion chamber in the form of a hot blast, the gas in the second casing flowing in counter-current direction to the gas in the first casing, the gases flowing through said casings cooling the same and maintaining the temperature of the second casing sufficiently low for manual handling of the torch.

WILLIAM M. PHILLIPS, Jr.